United States Patent
Seifried

(10) Patent No.: US 7,987,831 B2
(45) Date of Patent: Aug. 2, 2011

(54) METHOD FOR THE PRODUCTION OF A SINGLE PART PISTON AND A PISTON PRODUCED BY SUCH A METHOD

(75) Inventor: Matthias Seifried, Herrenzimmern (DE)

(73) Assignee: MAHLE International GmbH, Stuttgart (DE)

( * ) Notice: Subject to any disclaimer, the term of this patent is extended or adjusted under 35 U.S.C. 154(b) by 418 days.

(21) Appl. No.: 12/308,427

(22) PCT Filed: Jun. 8, 2007

(86) PCT No.: PCT/DE2007/001011
§ 371 (c)(1),
(2), (4) Date: Jan. 21, 2009

(87) PCT Pub. No.: WO2007/143968
PCT Pub. Date: Dec. 21, 2007

(65) Prior Publication Data
US 2010/0236515 A1    Sep. 23, 2010

(30) Foreign Application Priority Data
Jun. 16, 2006 (DE) .......................... 10 2006 027 810

(51) Int. Cl.
*F02F 3/20* (2006.01)
*B23P 15/10* (2006.01)
(52) U.S. Cl. ................ 123/193.6; 123/41.35; 29/888.04
(58) Field of Classification Search ............... 123/193.6, 123/41.35; 92/186, 208; 29/888.04
See application file for complete search history.

(56) References Cited

U.S. PATENT DOCUMENTS

| 3,464,100 | A | | 9/1969 | Foulet |
| 4,302,992 | A | * | 12/1981 | Skrentner .................... 82/19 |
| 5,778,533 | A | | 7/1998 | Kemnitz |
| 6,474,220 | B2 | | 11/2002 | Ries |
| 6,487,773 | B1 | | 12/2002 | Scharp et al. |
| 6,698,392 | B1 | * | 3/2004 | Kohnert et al. ............. 123/193.6 |
| 6,763,757 | B2 | * | 7/2004 | Huang et al. ................... 92/186 |
| 6,772,846 | B1 | * | 8/2004 | Scharp .............................. 173/1 |
| 6,938,603 | B2 | | 9/2005 | Scharp |
| 2004/0231631 | A1 | | 11/2004 | Scharp |

FOREIGN PATENT DOCUMENTS

| AT | 354 325 | 1/1980 |
| AT | 354325 | 1/1980 |
| DE | 44 46 726 | 6/1996 |
| DE | 100 13 395 | 8/2001 |

(Continued)

*Primary Examiner* — M. McMahon
(74) *Attorney, Agent, or Firm* — Collard & Roe, P.C.

(57) ABSTRACT

The present invention relates to a method for producing a single part piston (20) for an internal combustion engine from a piston blank (10), with a cooling channel (15) that is open in the downward direction running circularly inside a piston head (11), and an annular recess (16) built between the piston head (11) and a piston shaft (13), wherein the piston head (11) and the piston shaft (13) are connected to each other by means of a piston hub (14), and wherein the annular recess (16) and the cooling channel (15) are machined into the piston blank (10) by means of a cutting operation. According to the invention, it is provided that, for the cutting operation of the cooling channel (15), a tool (17) is moved into the area of the cooling channel (15) in an arc-shaped pivoting movement (A) through the recess (16), and that the cooling channel (15) is cut.

6 Claims, 3 Drawing Sheets

Figure 1:
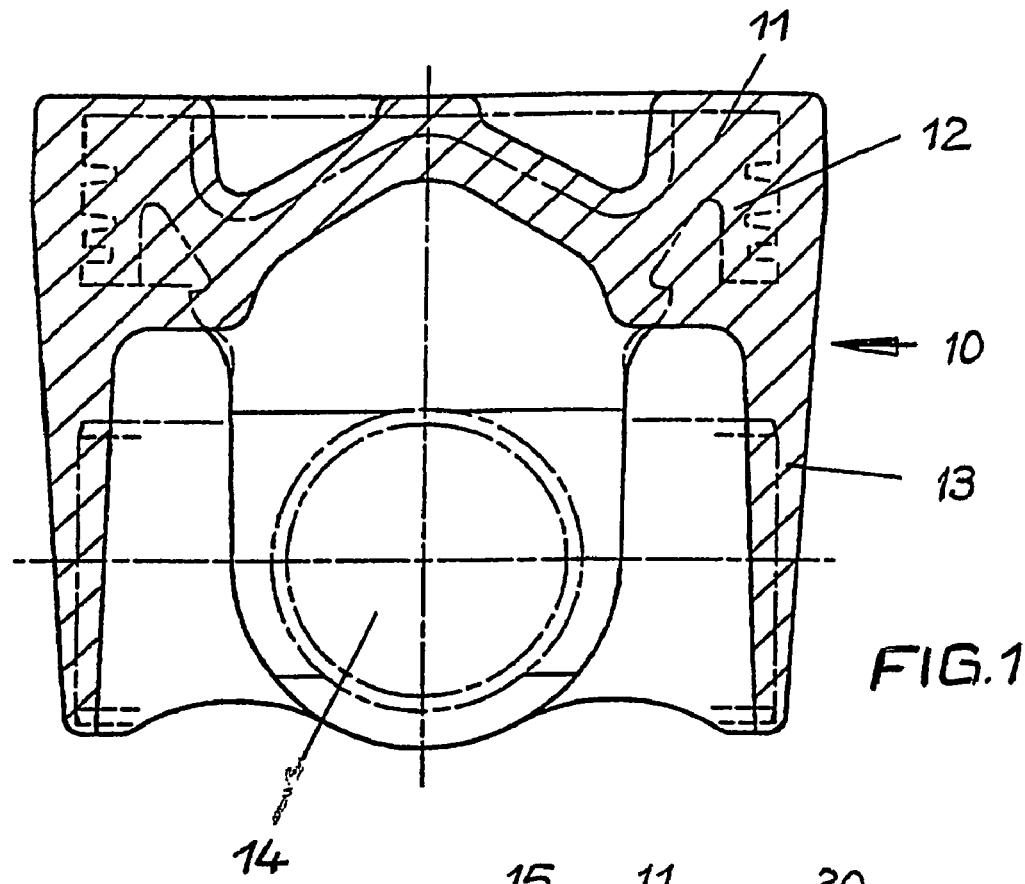

| | FOREIGN PATENT DOCUMENTS | | | | |
|---|---|---|---|---|---|
| DE | 101 52 316 | 7/2002 | DE | 602 04 296 | 4/2006 |
| DE | 101 32 446 | 1/2003 | WO | WO 02/076672 | 10/2002 |
| DE | 103 22 921 | 12/2004 | | | |

* cited by examiner

METHOD FOR THE PRODUCTION OF A SINGLE PART PISTON AND A PISTON PRODUCED BY SUCH A METHOD

CROSS REFERENCE TO RELATED APPLICATIONS

This application is the National Stage of PCT/DE2007/001011 filed on Jun. 8, 2007, which claims priority under 35 U.S.C. §119 of German Application No. 10 2006 027 810.0 filed on Jun. 16, 2006. The international application under PCT article 21(2) was not published in English.

The present invention relates to a method for the production of a one-part piston for an internal combustion engine, in accordance with the preamble of claim 1, and to a piston produced using this method.

Such a piston, produced using the casting method, is known from practice. In order to obtain a closed cooling channel in this connection, casting cores that can be dissolved out must be used, which make the production method more complicated and more expensive.

A one-part piston machined from a forged piston blank is known from the German patent DE 100 13 395 C1. For production of the cooling channel, two different work steps are required, which must be carried out with different lathes, while the piston is rotating. In the first work step, a ring-shaped recess is worked in, which is then supplemented with another axial recess. Only subsequently is this axial recess machined to produce the finished cooling channel, in the second work step. In this connection, it is disadvantageous that the piston must be stopped in a predetermined position, in its rotational movement, in order to introduce the lathes, namely in that position in which the lathe can be introduced between the piston skirts. Only after introduction of the lathe is the piston put into rotation again, and the cooling channel is machined.

In this connection, the lathes move exclusively in the radial and axial direction, relative to the piston axis. This has the result that the height of the cooling channel produced in this manner is dependent on the height of the recess between the piston head and the box-shaped piston skirt. The height of the cooling channel is always less than twice the height of the recess between piston head and piston skirt, because not only the height of this recess, but also the thickness of the tools used, limits the height of the cooling channel that can be reached.

The present invention is based on the task of making available a method for the production of a one-part piston, and such a piston, in which the height of the cooling channel can be structured independent of the height of the recess between the piston head and the piston skirt, and which can be carried out without interrupting the rotational movement of the piston.

The solution consists in a method having the characteristics of claim 1, and in a piston produced according to the method according to the invention. In this connection, it is provided, according to the invention, that for cutting machining of the cooling channel, a tool is moved into the region of the cooling channel while the piston is rotating, in an arc-shaped pivoting movement, through the recess, and the cooling channel is machined out.

The method according to the invention makes it possible, for the first time, to structure the height of the cooling channel independent of the height of the recess between piston head and piston skirt. The arc-shaped pivoting movement of the tool, according to the invention, which is not carried out parallel to the pin boss surfaces, brings about the result that the dimensions of the tool used are not limited by the height of the recess between piston head and piston skirt. The height of the cooling channel can therefore be adapted to the demands on the piston to be produced, in each instance, at any time. Thus, the method according to the invention can be used with the most varied piston types.

The present invention is furthermore characterized in that the cooling channel can be produced in a single work step, using a single tool, proceeding from the ring-shaped recess between piston head and piston skirt. This saves work time and tool costs, thereby making it possible to lower the production costs as a whole.

Advantageous further developments are evident from the dependent claims.

In a preferred embodiment, the arc-shaped pivoting movement of the tool, through the recess, into the region of the cooling channel, takes place while the piston blank is rotating. The piston blank can therefore be kept in a constant rotational movement, and this further simplifies the sequence of the method according to the invention, and saves both time and energy.

Another advantageous embodiment consists in the fact that the cutting machining of the cooling channel already takes place during the arc-shaped pivoting movement of the tool. This allows a continuous production process, with the corresponding savings in time and costs, but also makes the method according to the invention independent of the height of the recess between piston head and piston skirt.

A tool that is suitable for the method according to the invention is, for example, a lathe tool, particularly a hook-shaped lathe tool.

An exemplary embodiment of the invention will be described in greater detail in the following, using the attached drawings. These show, in a schematic representation, not true to scale:

FIG. 1 a piston blank with the piston according to the invention indicated with a dot-dash line, in a side view, in section;

FIGS. 2-6 a representation of the arc-shaped pivoting movement of a lathe tool, through the recess, into the region of the cooling channel, according to the invention.

FIG. 1 shows a one-part forged piston blank 10, which has been produced, in the exemplary embodiment, according to a known die-forging method. The contour of the finished piston 20 is indicated with dot-dash lines. The piston blank 10 comprises a piston head 11 having the subsequent piston ring belt 12, a piston skirt 13, and pin bosses 14 suspended on the piston head 11, and can be produced, for example, from a forgeable steel or a light-metal alloy, such as an aluminum alloy, for example.

FIGS. 2 to 6 show the method steps for production of a cooling channel 15, according to the invention, in the region of the piston ring belt 12.

In a first method step, a ring-shaped recess 16 is made in the piston blank 10, by means of cutting machining; in the case of the exemplary embodiment, by means of lathing. The height of the recess 16 only has to be so great that a tool, a hook-shaped lathe tool 17 in the case of the exemplary embodiment, can be moved into the region of the cooling channel 15 that is to be produced, while the piston is rotating, in an arc-shaped pivoting movement. Because of this recess 16, the piston head 11 is still connected with the piston skirt 13 only by way of the pin bosses 14.

To produce the ring-shaped circumferential cooling channel 15 in the region of the piston ring belt 12, the hook-shaped lathe tool 17 is now moved into the region of the cooling channel 15 to be produced, while the piston is rotating, in an arc-shaped pivoting movement A. Because of this arc-shaped pivoting movement, the height of the recess 16 can be significantly smaller than the height h of the hook-shaped lathe tool 17. This has the result that the height h of the lathe tool 17 can be selected to be higher than the height of the recess 16, so that a cooling channel 15 can be worked out in the axial direction, the depth of which can be not only significantly greater than the height of the recess 16, but the depth of which can be selected completely independent of the height of the recess 16. Practically any depth, almost without limits, of the cooling channel 15 can be achieved in the case of optimized configuration and path guidance of the lathe tool 17. Thus, the most varied types of one-part pistons can be produced using the method according to the invention, and they can be optimally adapted to the requirements of the engine type, in each instance.

It should furthermore be emphasized that the cooling channel 15 is produced in a single work step, using a single tool 17, such as the aforementioned hook-shaped lathe tool, for example, while the piston is rotating.

FIGS. 2 to 6 illustrate the arc-shaped pivoting movement of the tool, the hook-shaped lathe tool 17 in the exemplary embodiment, in individual steps. In this connection, to make the illustration clearer, the representation of the piston blank 10 was replaced with the illustration of the finished piston 20.

Figure 2:
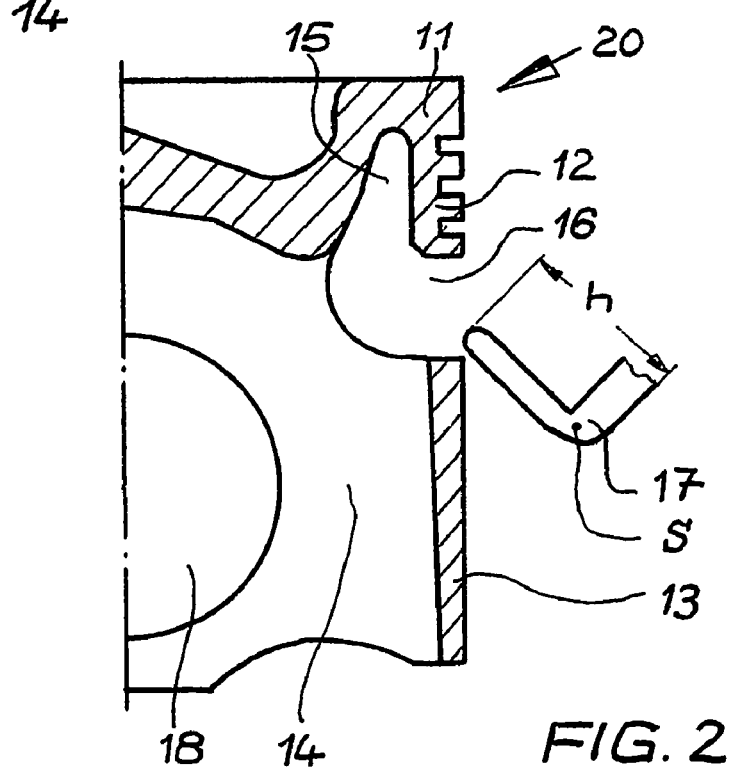

FIG. 2 shows the lathe tool 17 being set against the piston blank in a tilted angle position.

Figure 3:
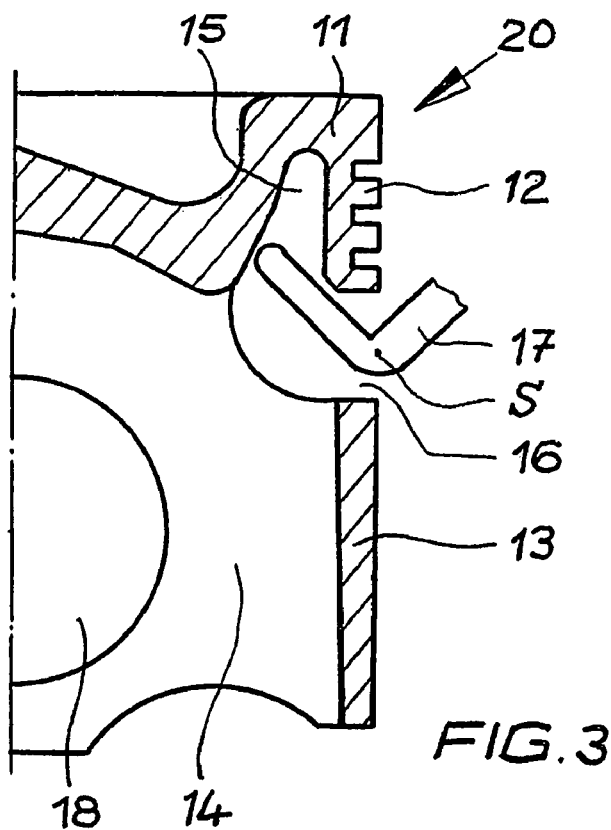

FIG. 3 shows the penetration of the lathe tool 17 through the recess 16 into the region of the cooling channel 15, whereby the lathe tool 17 performs not only a radial and an axial movement, but also a pivoting movement about the pivot point S.

Figure 4:
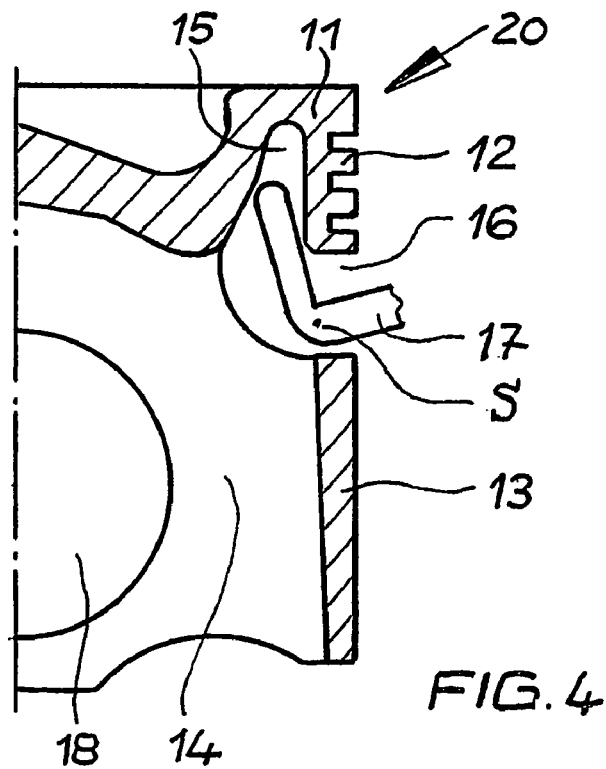

FIG. 4 shows the lathe tool 17 during the arc-shaped pivoting movement about the pivot point S, in which the shape of the cooling channel 15 is being worked out.

Figure 5:
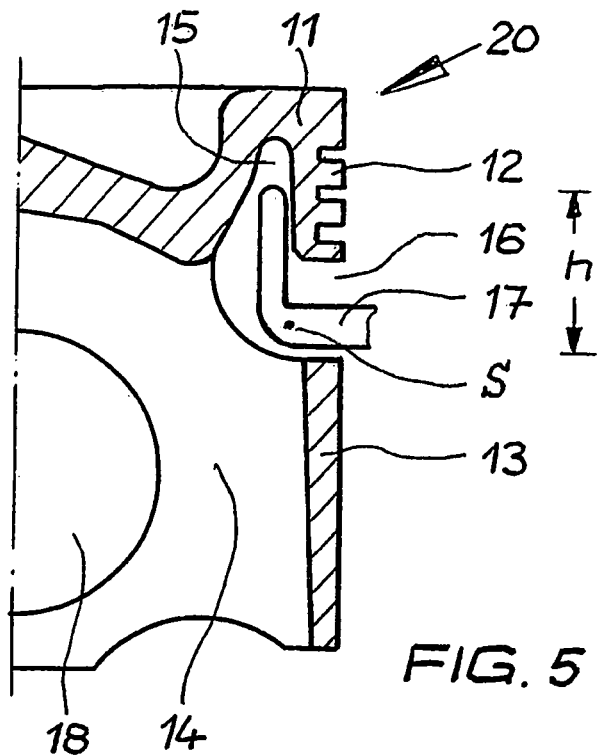

FIG. 5 shows the lathe tool 17 at the end of its pivoting movement about the pivot point S, during the transition into another axial movement. In this representation, it can be clearly seen that the lathe tool 17 has a significantly greater height h than the recess 16.

Figure 6:
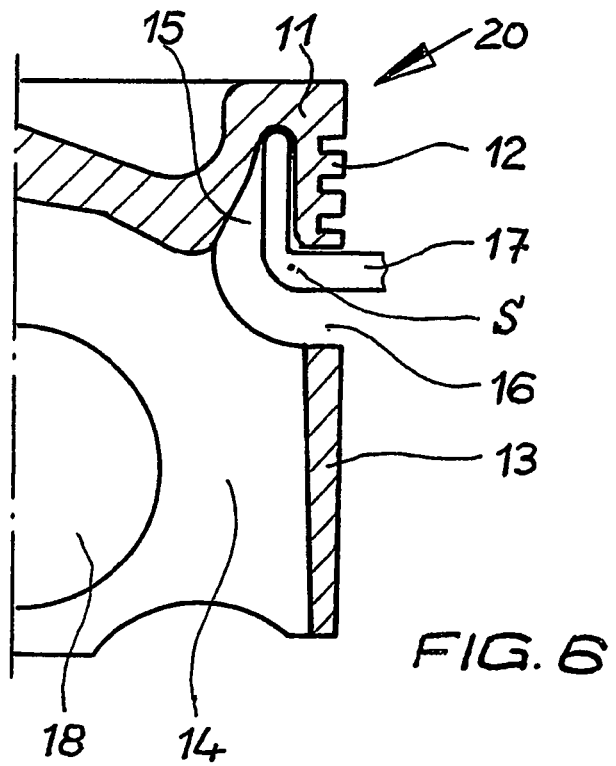

FIG. 6, finally, shows how the lathe tool 17 has reached its end position, and the cooling channel 15 has obtained its final shape and depth.

From the production process described, it becomes clear that a cooling channel 15 having any desired depth can be produced using the lathe tool 17 that sits on a tool head, as a result of its arc-shaped pivoting movement about a pivot point S.

After completion of the cooling channel 15, pin bores 18 are made in known manner, and the outer contour of the piston 20 is finished using cutting methods.

To close off the cooling channel 15, which is open towards the bottom, a two-part cover ring (e.g. a divided disk spring) is introduced into the piston head 11, under bias, with appropriate contact, in known manner. The cover ring is provided with an inflow opening and an outflow opening for the cooling oil (not shown).

Using the method according to the invention, a one-part piston according to the invention is produced, in particularly simple and cost-advantageous manner, which piston has greater strength, for example, as compared with pistons produced using the casting method, on the basis of the free selection of its material—forged steel or forgeable lightmetal alloy—so that it is very well suited, in particular, for diesel engines, which are subject to great stress.

The invention claimed is:

1. Method for the production of a one-part piston (20) for an internal combustion engine, from a piston blank (10), having a cooling channel (15) that runs in ring shape on the circumference of a piston head (11), and is open towards the bottom, and a ring-shaped recess (16) configured between the piston head (11) and a piston skirt (13), whereby the piston head (11) and the piston skirt (13) are connected with one another by means of pin bosses (14), and whereby the ring-shaped recess (16) and the cooling channel (15) are worked into the piston blank (10) by means of cutting machining, and subsequently, the outer contour is finished and the cooling channel is closed off, wherein for cutting machining of the cooling channel (15), a tool (17) is moved into the region of the cooling channel (15), while the piston is rotating, in an arc-shaped pivoting movement (A), through the recess (16), and the cooling channel (15) is machined out.

2. Method according to claim 1, wherein the arc-shaped pivoting movement (A) of the tool (17) through the recess (16) takes place into the region of the cooling channel (15) while the piston blank (10) is rotating.

3. Method according to claim 1, wherein the cutting machining of the cooling channel (15) takes place during the arc-shaped pivoting movement (A) of the tool (17).

4. Method according to claim 1, wherein a lathe tool, particularly a hook-shaped lathe tool, is used as the tool (17).

5. Piston (10) for an internal combustion engine, produced using a method according to claim 1.

6. Piston according to claim 5, wherein the axial height of the cooling channel (15) is greater than the axial height of the recess (16).

* * * * *